(12) United States Patent
Penner

(10) Patent No.: US 9,371,627 B2
(45) Date of Patent: Jun. 21, 2016

(54) DITCHING APPARATUS WITH DIVERGENT V-WING BLADE CONFIGURATION

(76) Inventor: Jeffrey Ryan Penner, Swan River (CA)

( * ) Notice: Subject to any disclaimer, the term of this patent is extended or adjusted under 35 U.S.C. 154(b) by 0 days.

(21) Appl. No.: 14/114,861

(22) PCT Filed: Dec. 8, 2011

(86) PCT No.: PCT/CA2011/050758
§ 371 (c)(1),
(2), (4) Date: Jun. 23, 2014

(87) PCT Pub. No.: WO2012/151659
PCT Pub. Date: Nov. 15, 2012

(65) Prior Publication Data
US 2014/0331527 A1 Nov. 13, 2014

Related U.S. Application Data

(60) Provisional application No. 61/483,331, filed on May 6, 2011.

(51) Int. Cl.
| | |
|---|---|
| *E02F 5/02* | (2006.01) |
| *E02F 3/76* | (2006.01) |
| *E02F 3/815* | (2006.01) |
| *A01B 13/02* | (2006.01) |

(52) U.S. Cl.
CPC .......... *E02F 5/027* (2013.01); *A01B 13/02* (2013.01); *E02F 3/7604* (2013.01); *E02F 3/7681* (2013.01); *E02F 3/7686* (2013.01); *E02F 3/8152* (2013.01); *E02F 5/022* (2013.01)

(58) Field of Classification Search
CPC .................. E02F 5/027; E02F 5/106

USPC .................................................. 37/366, 372
See application file for complete search history.

(56) References Cited

U.S. PATENT DOCUMENTS

| | | | | |
|---|---|---|---|---|
| 632,060 | A | | 8/1899 | Ponton |
| 2,136,911 | A | | 11/1938 | Briscoe |
| RE20,990 | E | * | 1/1939 | Wright ............................ 37/366 |
| 2,297,938 | A | * | 10/1942 | Briscoe .......................... 37/372 |
| 2,320,855 | A | * | 6/1943 | Dukes ............................ 37/372 |
| 2,426,847 | A | | 9/1947 | Smith |
| 2,547,680 | A | * | 4/1951 | Wright ............................ 37/372 |

(Continued)

FOREIGN PATENT DOCUMENTS

JP         2005002672         1/2005

*Primary Examiner* — Matthew D Troutman
(74) *Attorney, Agent, or Firm* — Kyle R. Satterthwaite; Ryan W. Dupuis; Ade & Company Inc.

(57) ABSTRACT

A ditching apparatus features front blade sections fixed to the frame in a V-configuration, and a pull tongue extending over the blade apex to a pivotal connection near a rear of the frame. An actuation mechanism effects relative pivoting between the frame and the pull tongue to adjust an angle between the front blade and the trailer tongue to control a ground-penetration depth of the blade apex. Two rear blade sections on opposing sides of the frame are movable between deployed positions extending rearwardly and laterally outward from the front blade sections, and stowed positions elevated out of the deployed positions. The blade angle and width are thus controllable to achieve a desired depth and width of ditch. A nose cap at the blade apex provides an improved ground breaking action, while internally braced blade structures will roll formed skins provide durability and smooth rolling action of displaced earth.

9 Claims, 12 Drawing Sheets

(56) References Cited

U.S. PATENT DOCUMENTS

| | | |
|---|---|---|
| 2,625,754 A | 1/1953 | Morgan |
| 2,662,311 A * | 12/1953 | Chattin .................. 37/372 |
| 2,668,376 A | 2/1954 | Briscoe |
| 2,673,409 A | 3/1954 | Briscoe |
| 2,849,809 A | 9/1958 | Chattin |
| 2,864,181 A | 12/1958 | Simmons |
| 2,911,735 A | 11/1959 | Sanner et al. |
| 3,035,360 A | 5/1962 | Johnson |
| 3,068,595 A | 12/1962 | Winn |
| 3,206,879 A | 9/1965 | Grover |
| 3,526,047 A | 9/1970 | Roessler et al. |
| 3,601,910 A * | 8/1971 | Goltz .................. 37/366 |
| 3,711,970 A | 1/1973 | Briar |
| 4,240,216 A | 12/1980 | Martel |
| 4,250,869 A | 2/1981 | Doyle |
| 5,890,546 A | 4/1999 | Kerpash, Sr. |
| 6,119,792 A | 9/2000 | Almer |
| 6,904,979 B1 | 6/2005 | Confoey |

* cited by examiner

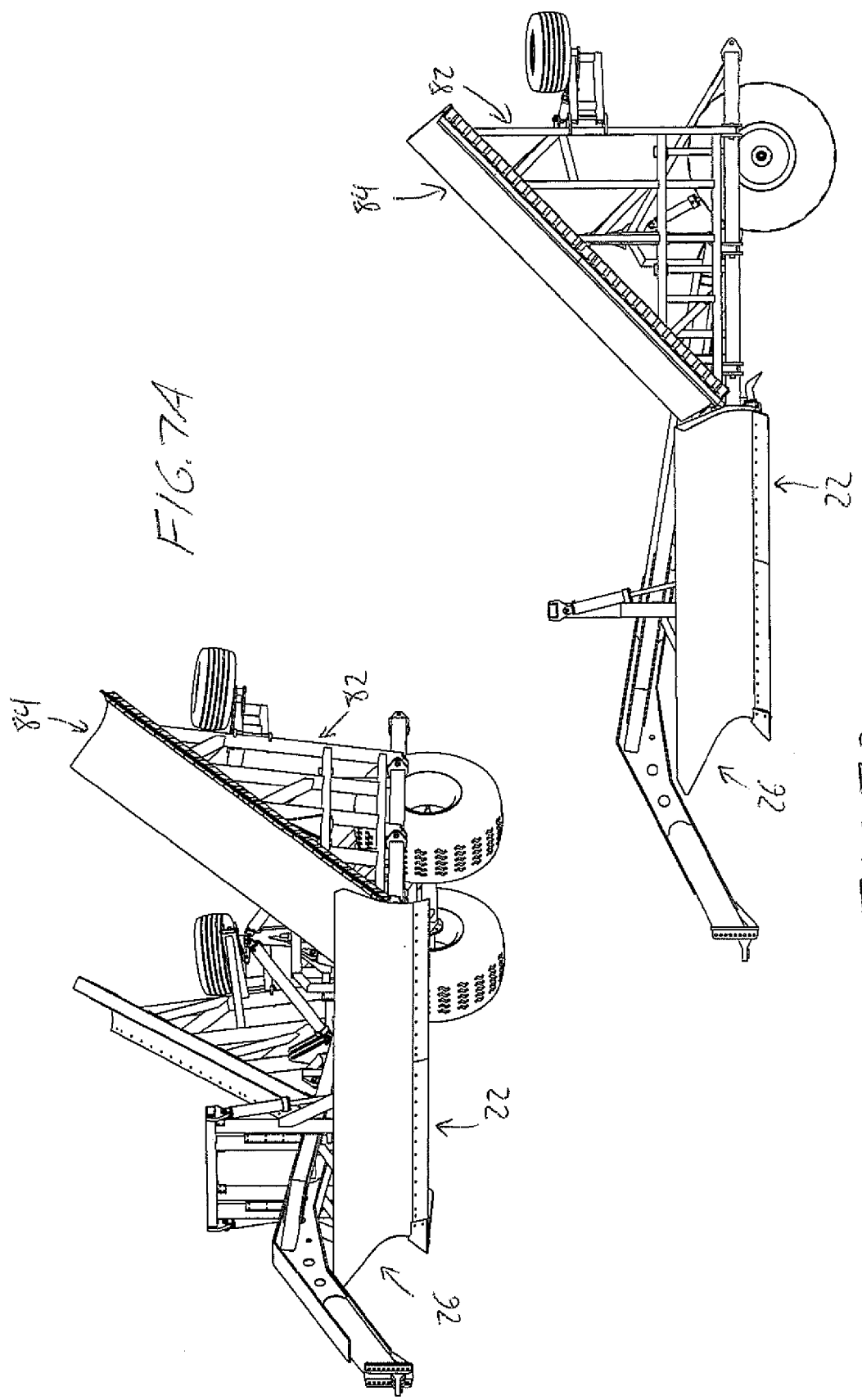

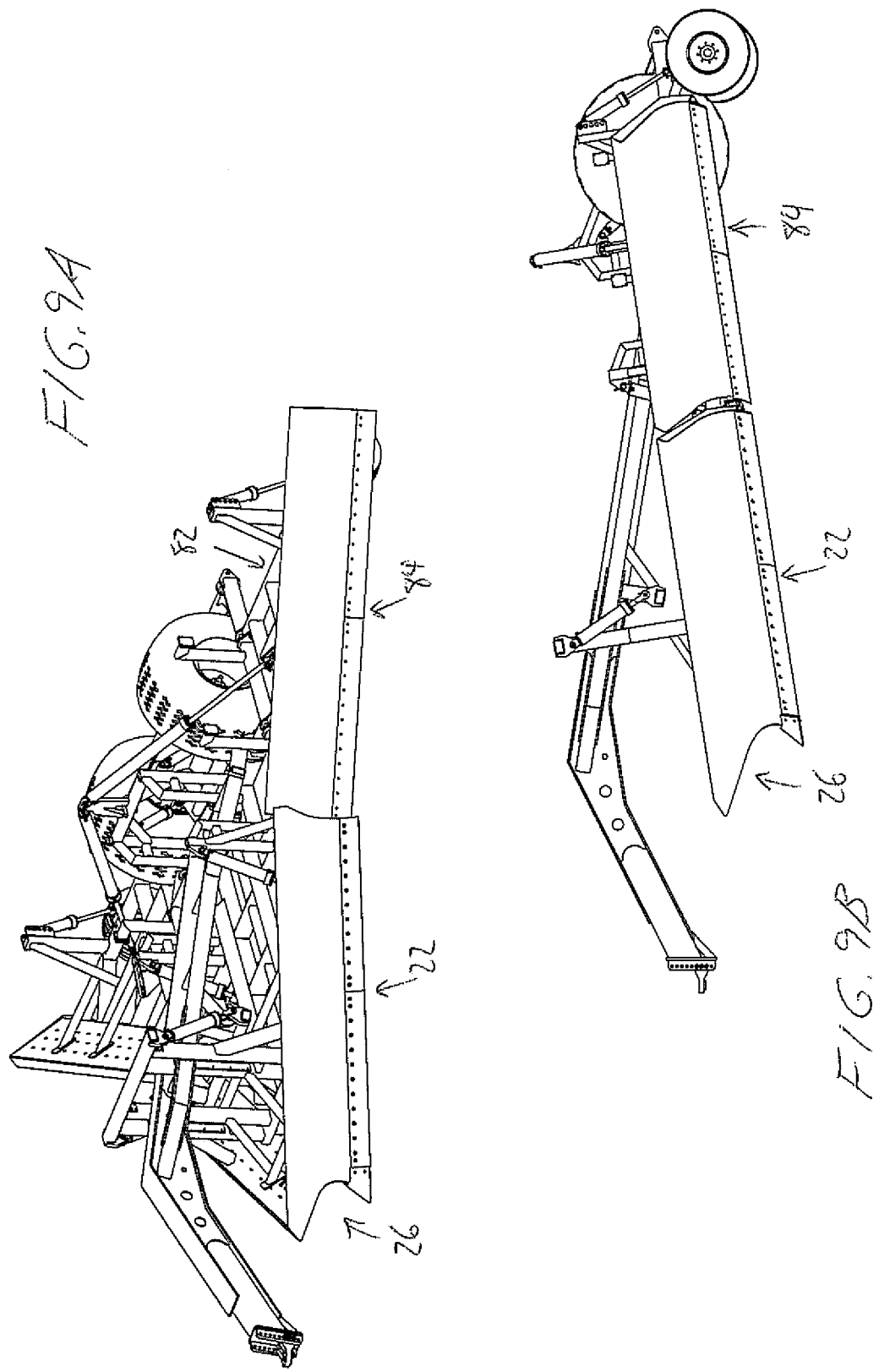

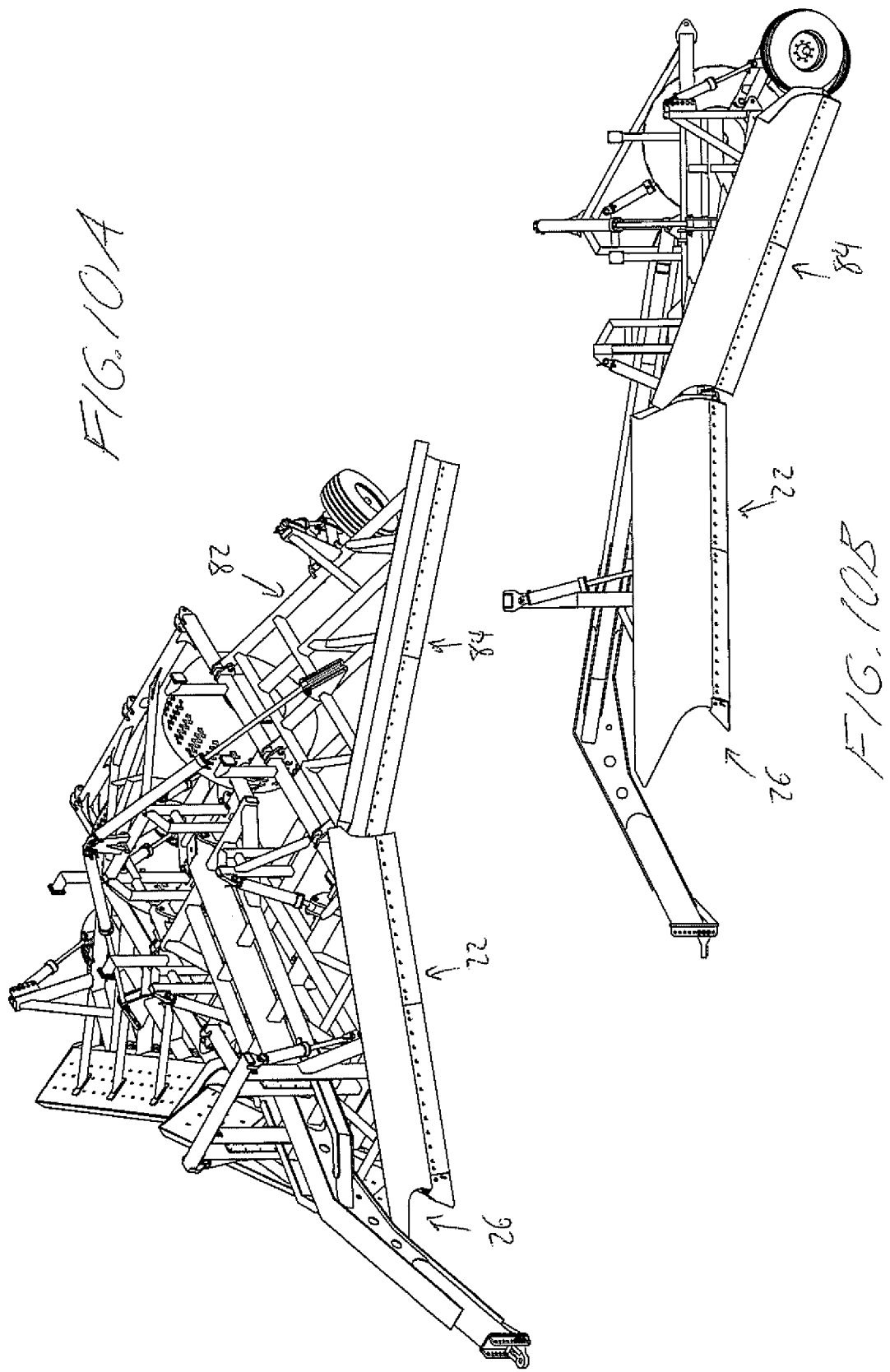

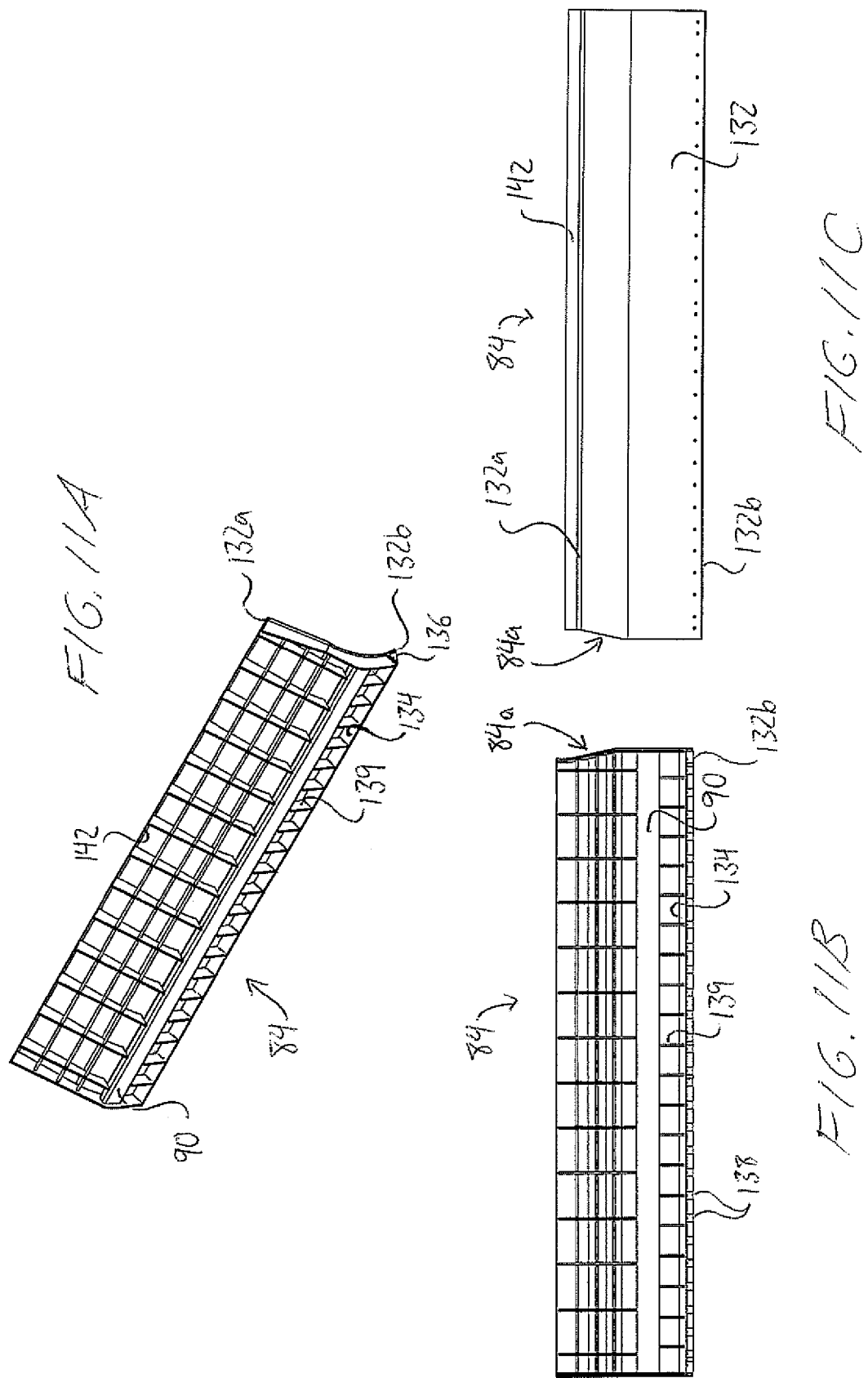

DITCHING APPARATUS WITH DIVERGENT V-WING BLADE CONFIGURATION

This application is the national stage of PCT/CA2011/050758, filed Dec. 8, 2011, and claims benefit under 35 U.S.C. 119(e) of U.S. Provisional Application Ser. No. 61/483,331, filed May 6, 2011.

FIELD OF THE INVENTION

The present invention relates generally to earth working machinery for forming ditches for drainage or other purposes, and more particularly to such machinery employing a V-shaped plow or blade configuration in which blade sections diverge rearwardly from an apex that is towed or driven in a forward working direction.

BACKGROUND OF THE INVENTION

Creation of relatively wide drainage ditches in agricultural fields using commercially available earth working equipment can be time and fuel intensive. For example, commercially available rotary ditchers and V-plow ditchers have relatively narrow working widths and limited earth-moving capacity, thus requiring multiple passes across a field to make a larger ditch.

Examples of previous V-plow ditcher designs are disclosed in U.S. Pat. Nos. 2,136,911, 2,625,754, 2,668,376, 2,849,809, 2,911,735, 3,068,595, 3,206,879, 3,526,047, 3,711,970, 4,240,216, and 4,250,869, and include variable width designs where rear blades are movably mounted to adjust an angle at which the blades diverge.

U.S. Pat. No. 5,890,546 teaches an apparatus featuring a straight cross-wide blade with end-wing sections that pivot up and down between stowed and deployed positions to change the effective blade width, but the single straight blade intended for scraping, leveling or grading operations is not suitable for forming ditches.

U.S. Pat. No. 6,904,979 teaches an earth working apparatus with a V-shaped blade configuration at its front end and a straight cross-wide blade therebehind. The height of the rear blade and the angle of the front blade can be adjusted, allowing use of the apex of the front blade to dig a ditch with the front blade tilted down and the rear blade lifted entirely off the ground, but the narrow width of the front blade limits the achievable ditch width.

To address the need for more efficient production of large scale ditches, application has developed a unique large scale V-type ditcher capable of displacing greater volumes of soil per unit of towing distance to enable single-pass formation of ditches of greater depth and/or width, and in doing so has generated a number of unique configurations within the structure and layout of the machine.

SUMMARY OF THE INVENTION

According to a first aspect of the invention there is provided a ditching apparatus for pulling by a tow vehicle, the ditching apparatus comprising:

a frame having a leading end and an opposing trailing end spaced apart along a working direction in the apparatus is to be drawn by the tow vehicle;

wheels rotatably carried on the frame adjacent the trailing end thereof for rolling support thereof;

two front blade sections respectively disposed on opposing sides of a longitudinal axis passing through the opposed leading and trailing ends of the frame, the two blade sections being fixed to the frame and diverging away from one another from a blade apex ahead of the leading end of the frame toward the opposing trailing end of the frame, and each blade section presenting an working surface that faces forwardly and laterally outward from the frame and curves concavely between upper and lower edges of the working surface;

a pull tongue having a front end adapted for coupling with the tow vehicle at a location forward of the blade apex and leading end of the frame, the pull tongue extending over the blade apex and the leading end of the frame to a rear end of the pull tongue, where a pivotal connection couples the pull tongue to the frame at a location nearer to the trailing end of the frame than to the leading thereof, the pivotal connection allowing relative pivoting between the pull tongue and the frame about a transverse pivot axis oriented cross-wise to the longitudinal axis;

an undercarriage mounted to the pull tongue;

an upright structure upstanding from the frame on opposite sides of the pull tongue at a position between the pivotal connection and the leading end of the frame; and a first pair of hydraulic actuators disposed on said opposite sides of the pull tongue at a location nearer to the leading end of the frame than to the trailing end thereof, each actuator having a lower end thereof coupled to the undercarriage at a distance below the pull tongue and an upper end coupled to the upright structure, the hydraulic actuators being extendable and retractable to effect relative pivoting between the frame and the pull tongue in opposite directions about the transverse pivot axis to move the blade apex at the leading end of the frame respectively upward and downward relative to the pull tongue;

whereby operation of the first pair of hydraulic actuators enables adjustment of an angle between the blade sections on the frame and the trailer tongue to control a depth to which the blade apex penetrates the ground over which the apparatus is pulled by the tow vehicle.

Preferably there is provided a second pair of hydraulic actuators that are coupled between the frame and wheel carriers on which the wheels are carried and are operable to raise and lower the trailing end of the frame relative to the ground by moving the wheels and upward and downward relative to the frame.

Preferably there are provided two rear blade sections having working positions disposed on opposing sides of the frame to extend respectively rearwardly and laterally outward from ends of the front blade sections opposite the blade apex.

Preferably the two rear blade sections are movably mounted on the opposing sides of the frame and movable between the deployed working positions extending respectively rearwardly and laterally outward from ends of the front blade sections opposite the blade apex, and stowed positions elevated out of the deployed positions at the ends of the front blade sections.

In the working positions, the rear blade sections preferably diverge toward the trailing end of the frame at a greater angle relative to one another than the front blade sections.

Preferably there are provided rear blade support sub frames that are pivotally mounted on respective sides of the frame and on which the rear blade sections are rigidly mounted at fixed positions on the sub frames.

Preferably there are provided outboard wheels rotatably carried on the rear blade support sub frames.

Preferably each outboard wheel is movably carried one of the sub frames and adjustable in position to change a position of a rotational axis of the outboard wheel relative to a plane of the sub frame.

Preferably a range of motion through which each outboard wheel is movable is sufficient to reposition the rotational axis of the outboard wheel from one side of the plane of the sub frame to another.

Preferably the working surface of each blade section is defined by one or more roll-formed metal panels forming a smooth continuous curve between the edges of the working surface.

Preferably each blade section comprises inner and outer skins separated by internal reinforcements disposed therebetween, the outer skin presenting the working surfaces and the inner skin being rigidly attached to the frame.

According to a second aspect of the invention there is provided a ditching apparatus comprising:

a frame having a leading end and an opposing trailing end spaced apart along a working direction in the apparatus is to be conveyed over the ground;

wheels rotatably carried on the frame adjacent the trailing end thereof for rolling support thereof;

two front blade sections carried on the frame on opposing sides of a longitudinal axis passing through the opposed leading and trailing ends of the frame, the two blade sections diverging away from one another from a blade apex ahead of the leading end of the frame toward the opposing trailing end of the frame, each blade section presenting an working surface that faces forwardly and laterally outward from the frame and curves concavely between upper and lower edges of the working surface, and each blade section having a bottom working edge at a lowermost extent thereof;

an actuation mechanism coupled to the frame and operable to lower and raise the two front blade sections into and out of a working position engaging the blade apex into the ground; and a nose cap mounted over a seam at which the front blade sections meet at the blade apex, the nose cap having a central portion spanning laterally across the seam to increase an effective width of the blade apex.

Preferably the nose cap extends to only an upper side of a plane containing the bottom working edges of the blades sections.

Preferably the nose cap comprises wings extending rearwardly along the working surfaces of the front blade sections front the central portion, bottom edges of the wings being coplanar with the working edges of the blade sections.

Preferably the nose cap is a unitary piece that integrally defines the central portion and the wings.

Preferably the nose cap is a bent plate.

Preferably the working edge of each blade section is defined by one or more working plates fixed to the working surface to depend downward and outward therefrom, the bent plate of the nose cap being thicker than each working plate.

Preferably the central portion of the nose cap presents a convexly curved forward facing outer surface.

According to a third aspect of the invention there is provided a ditching apparatus comprising:

a frame having a leading end and an opposing trailing end spaced apart along a working direction in the apparatus is to be conveyed over the ground;

wheels rotatably carried on the frame adjacent the trailing end thereof for rolling support thereof;

two front blade sections carried on the frame on opposing sides of a longitudinal axis passing through the opposed leading and trailing ends of the frame, the two blade sections diverging away from one another from a blade apex ahead of the leading end of the frame toward the opposing trailing end of the frame, and each blade section presenting an working surface that faces forwardly and laterally outward from the frame and curves concavely between upper and lower edges of the working surface; and an actuation mechanism coupled to the frame and operable to lower and raise the two front blade sections into and out of a working position engaging the blade apex into the ground;

wherein the working surface of each blade section is defined by one or more roll-formed metal panels forming a smooth continuous curve between the edges of the working surface.

According to a fourth aspect of the invention there is provided a ditching apparatus comprising:

a frame having a leading end and an opposing trailing end spaced apart along a working direction in the apparatus is to be conveyed over the ground;

wheels rotatably carried on the frame adjacent the trailing end thereof for rolling support thereof;

two front blade sections carried on the frame on opposing sides of a longitudinal axis passing through the opposed leading and trailing ends of the frame, the two blade sections diverging away from one another from a blade apex ahead of the leading end of the frame toward the opposing trailing end of the frame, and each blade section presenting an working surface that faces forwardly and laterally outward from the frame and curves concavely between upper and lower edges of the working surface; and an actuation mechanism coupled to the frame and operable to lower and raise the two front blade sections into and out of a working position engaging the blade apex into the ground;

wherein each blade section comprises inner and outer skins separated by internal reinforcements disposed therebetween, the outer skin presenting the working surfaces and the inner skin being rigidly attached to the frame.

According to a fifth aspect of the invention there is provided a ditching apparatus comprising:

a frame having a leading end and an opposing trailing end spaced apart along a working direction in the apparatus is to be conveyed over the ground;

wheels rotatably carried on the frame adjacent the trailing end thereof for rolling support thereof;

two front blade sections carried on the frame on opposing sides of a longitudinal axis passing through the opposed leading and trailing ends of the frame, the two blade sections diverging away from one another from a blade apex ahead of the leading end of the frame toward the opposing trailing end of the frame, and each blade section presenting an working surface that faces forwardly and laterally outward from the frame and curves concavely between upper and lower edges of the working surface;

a first actuation mechanism coupled to the frame and operable to lower and raise the leading end of the frame, at which the two front blade sections are carried, into and out of a working position engaging the blade apex into the ground; and two rear blade sections movably mounted on opposing sides of the frame, independently of the front blade sections, and raisable and lowerable about respective pivot axes that lie longitudinally of the frame by a second actuation mechanism between deployed positions extending respectively rearwardly and laterally outward from ends of the front blade sections opposite the blade apex, and stowed positions in which the rear blade sections are elevated out of the deployed positions at the ends of the front blade sections According to another aspect of the invention, there is provided A ditching apparatus comprising:

a frame having a leading end and an opposing trailing end spaced apart along a working direction in the apparatus is to be conveyed over the ground;

wheels rotatably carried on the frame adjacent the trailing end thereof for rolling support thereof;

two front blade sections carried on the frame on opposing sides of a longitudinal axis passing through the opposed leading and trailing ends of the frame, the two blade sections diverging away from one another from a blade apex ahead of the leading end of the frame toward the opposing trailing end of the frame, and each blade section presenting an working surface that faces forwardly and laterally outward from the frame and curves concavely between upper and lower edges of the working surface;

rear blade support sub frames movably mounted on respective sides of the frame independently of the front blade sections;

two rear blade sections mounted on the sub frames, the sub frames being positionable to situate the rear blade sections in positions extending respectively rearwardly and laterally outward from ends of the front blade sections opposite the blade apex; and outboard wheels rotably carried on the sub frames.

BRIEF DESCRIPTION OF THE DRAWINGS

In the accompanying drawings, which illustrate a exemplary embodiments of the present invention:

FIG. 2 FIG. 1 is a front side perspective view of the ditching apparatus of FIG. 1.

FIGS. 7A and 7B are front side perspective and side elevational views of the apparatus of FIG. 1 in a transport mode with the frame's front end lifted and the rear blade sections raised relative to the frame.

FIGS. 9A and 9B are front side perspective and side elevational views of the apparatus of FIG. 1 in a wide ditching mode with the front and rear blade sections aligned and the frame's front end lowered to dig the blade sections into the ground.

FIGS. 10A and 10B are front side perspective and side elevational views of the apparatus of FIG. 1 in a plowing mode with the front blade sections raised over the ground and one rear blade section lowered down past the frame to angle this rear blade section into ditch alongside the apparatus.

FIGS. 11A, 11B and 11C are rear end perspective, rear elevational and front elevational views of the rear blade sections of the apparatus of FIG. 1 with inner skins and working plates thereof removed for illustrative purposes.

DETAILED DESCRIPTION

Figure 1:
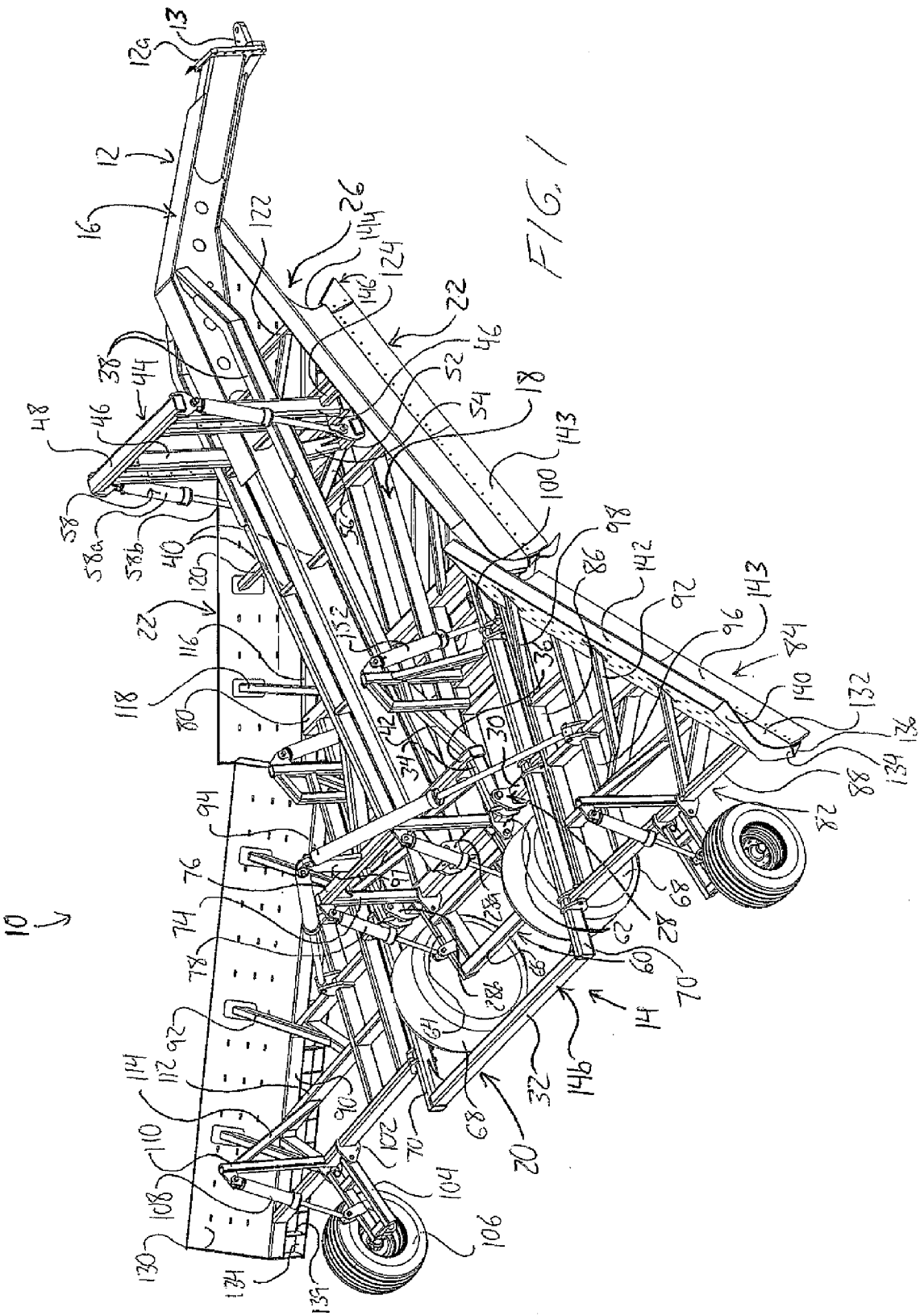
FIG. 1 is a rear side perspective view of a ditching apparatus of the present invention with rear blade sections thereof deployed, but with rear wheels lowered and the frame's front end lifted to position the blade in a transport position not engaging the ground.
Figure 2:
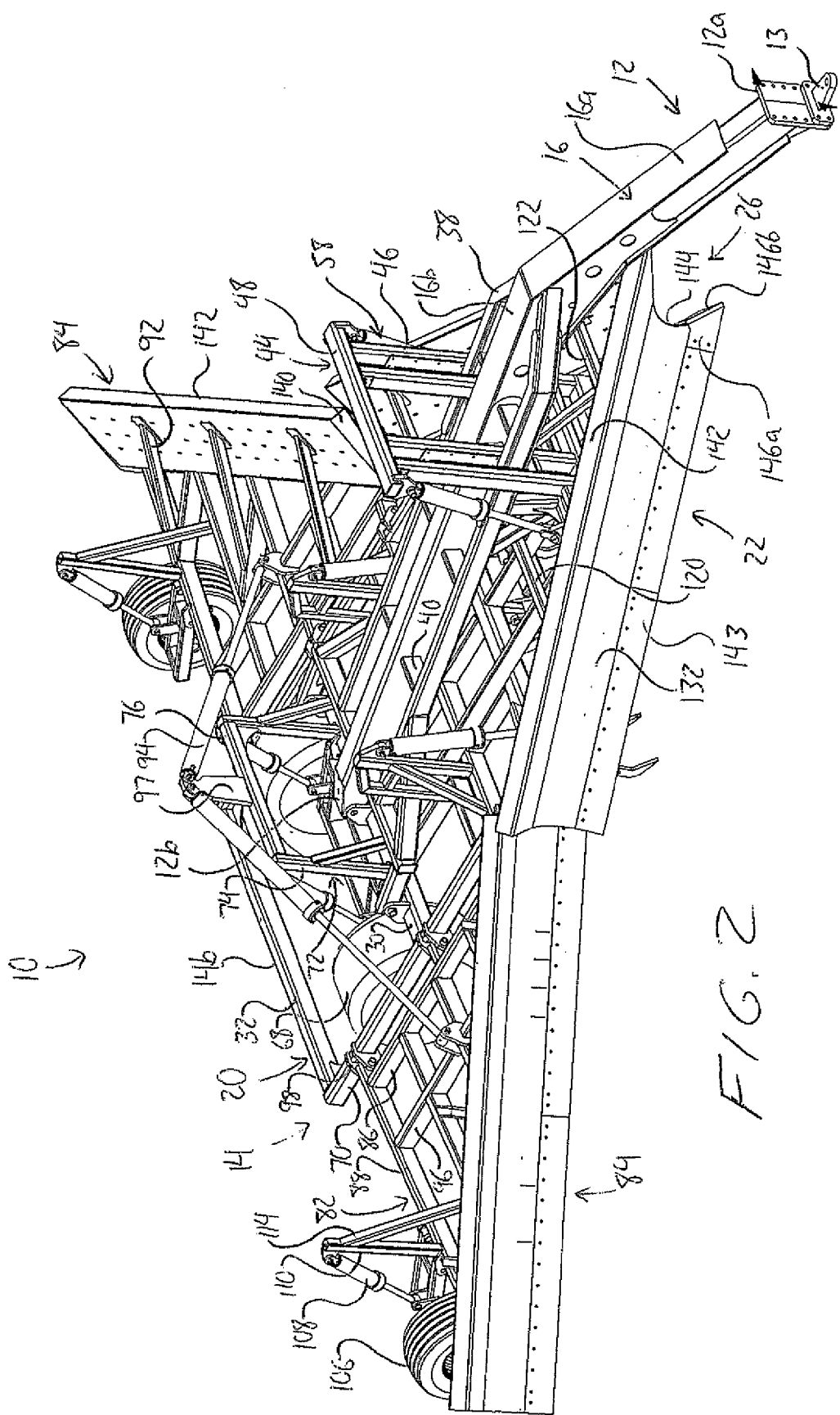
Figure 3:
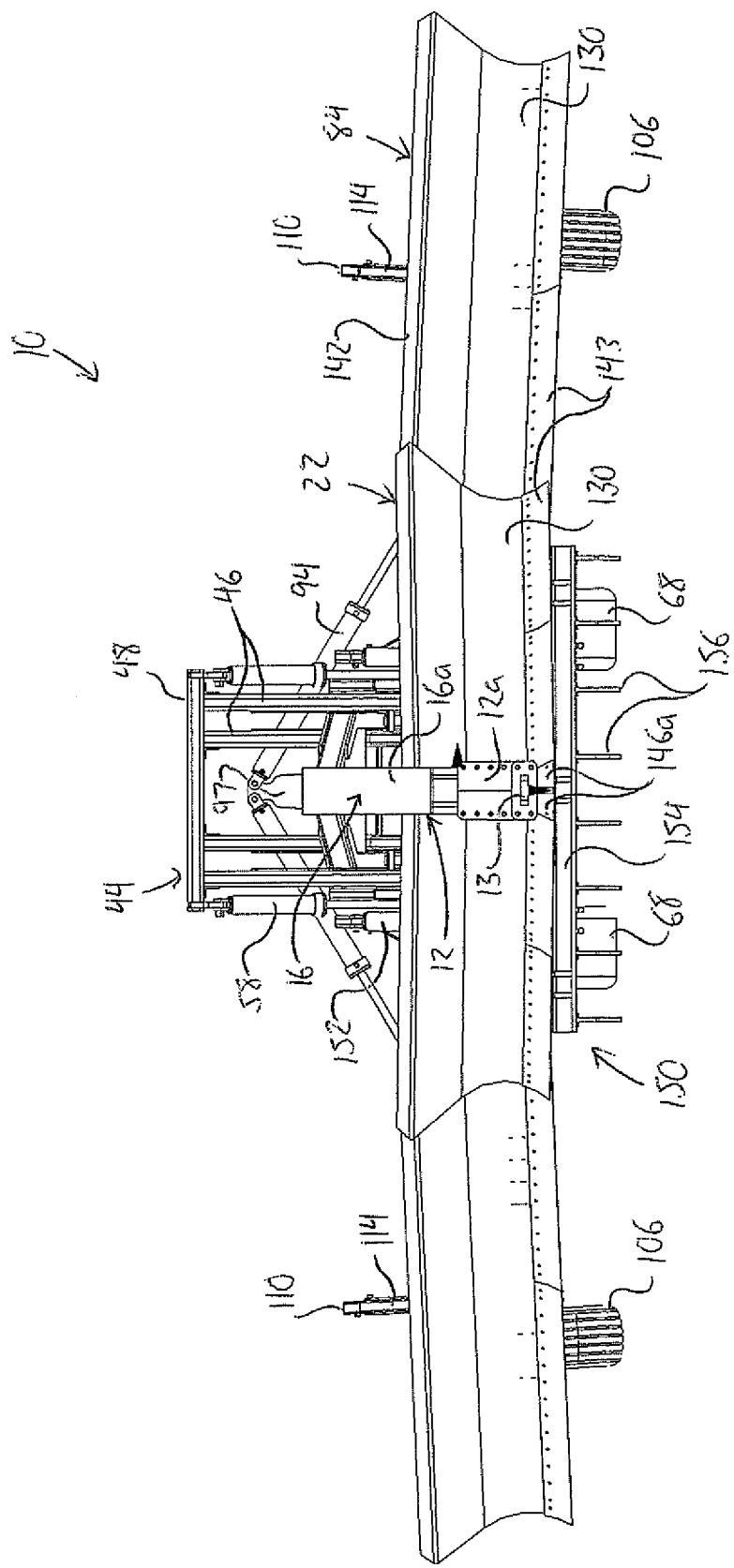
FIG. 3 is a front elevational view of the ditching apparatus of FIG. 1.
Figure 4:
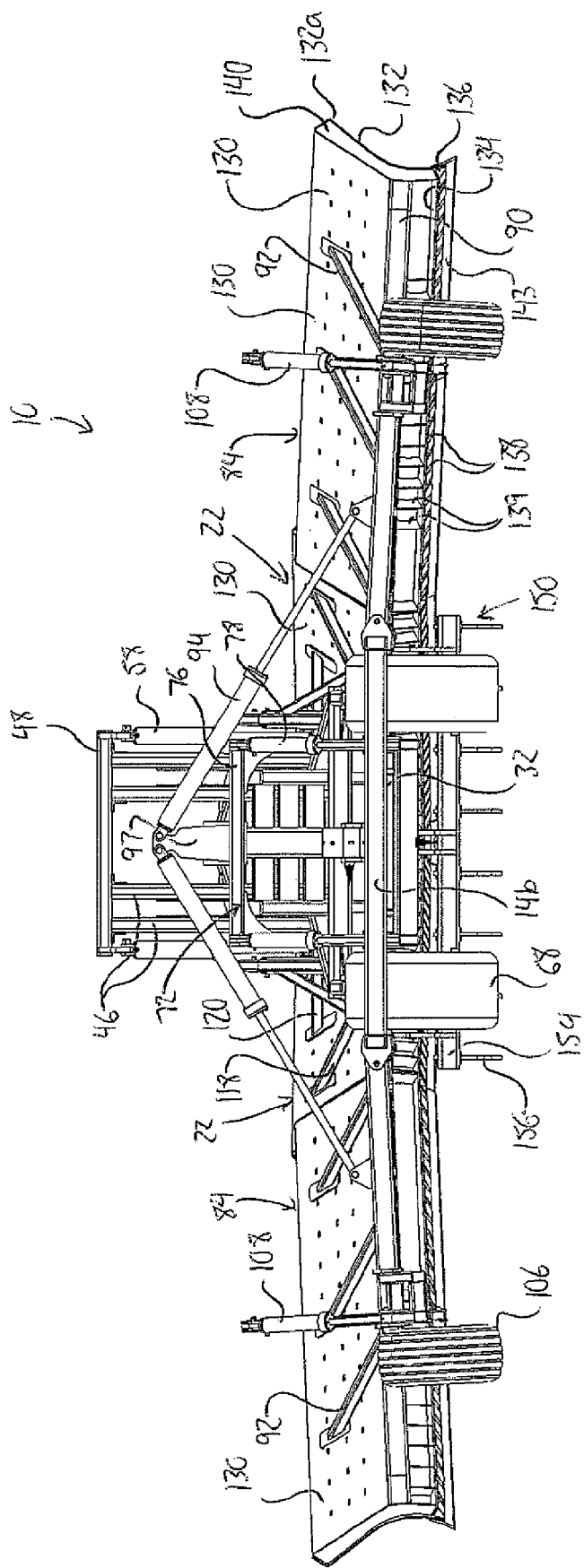
FIG. 4 is a rear elevational view of the ditching apparatus of FIG. 1.
Figure 5:
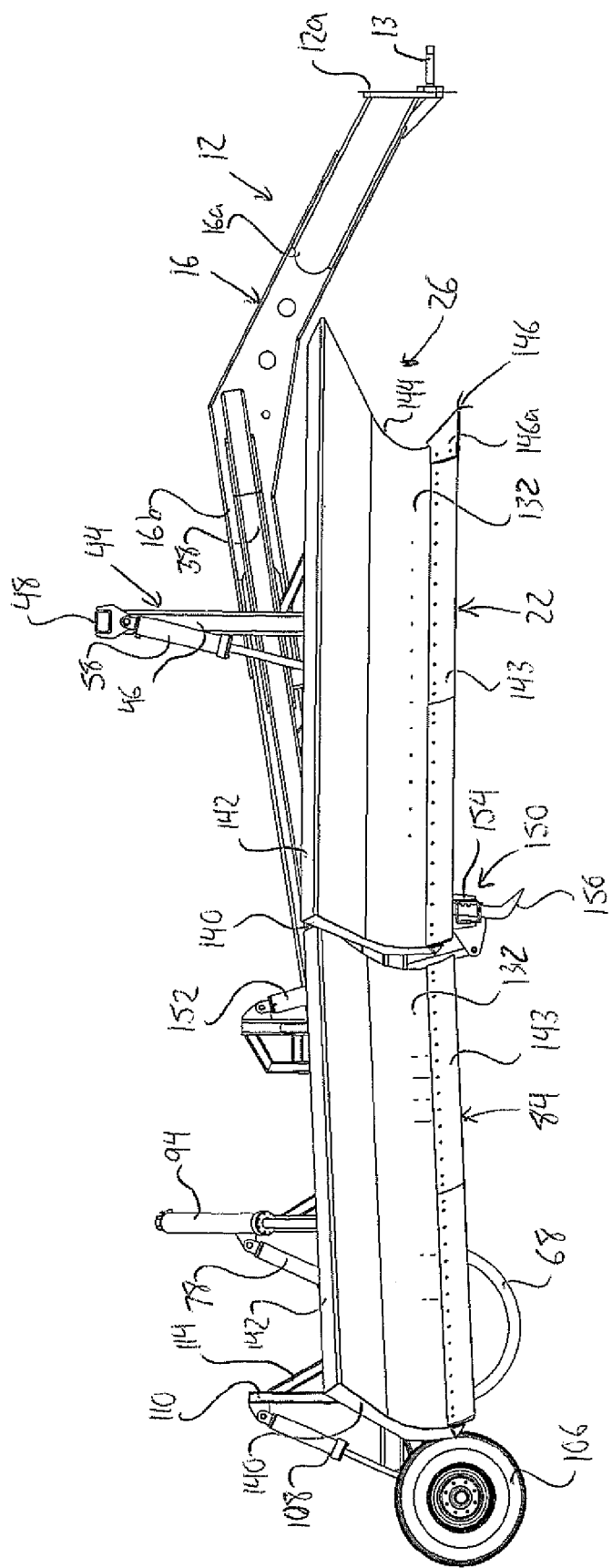
FIG. 5 is a side elevational view of the ditching apparatus of FIG. 1.

FIG. 1 shows a ditching apparatus 10 of the present invention, which is configured as a towable implement having a pull tongue 12 equipped at its front or leading end 12a with suitable hitch connection features 13 for coupling the pull tongue 12 to the hitch of a suitable towing vehicle, for example an agricultural tractor. At a distance back from the tongue's front end 12a, a rigid frame structure 14 of the apparatus lies below the tongue 12, and extends from a leading or front end of the frame 14 located generally below a bend in a main longitudinal member 16 of the tongue 12 to a trailing or rear end 14b of the frame 14 at a distance back from the rear end 12b of the tongue 12. The frame 14 features front and rear portions 18, 20 which are triangular and rectangular in plan, respectively. Front blade sections 22 are fixed to the front frame portion 18 on opposite sides thereof, meeting together in front of the front tip of the front portion 18 at the leading end of the frame to form an apex 26 of the blade structure. As described in further detail below, actuators are used to pivot the frame structure 14 relative to the pull tongue 12 to drive down the blade apex relative to the tongue to engage the bottom of the blade apex 26 into the ground, so that under towing of the apparatus by the tractor or other tow vehicle, the ground is split or divided by the apex and the broken up soil or earth rolls upward and laterally outward along the blade sections diverging rearward from the apex.

The configuration of the tongue 12 and frame 14, and the pivotal connection and operation thereof is described in greater detail as follows.

A first section 16a of the tongue's main longitudinal member 16 slopes obliquely upward and rearward from the front end 12a of the tongue 12 to where the main longitudinal member 16 then bends to form a second section 16b that slopes obliquely downward and rearward to a rear end 12b of the tongue, where the tongue 12 features a pivotal connection 28 to the frame 14 at a cross-member 30 of the rear frame portion 20 near, but somewhat ahead of, the frame's rear or trailing end 14b. The cross-members of the frame extend perpendicularly transverse to a longitudinal axis of the frame 14, which passes through the pointed leading end of the frame and centrally through the end cross-member 32 defining the trailing end 14b of the frame. The pivotal connection 28 between the frame 14 and the pull tongue 12 at the rear portion 14b of the frame defines a horizontal pivotal axis parallel to the cross-member 30 at short height thereabove. In the illustrated embodiment, the pivotal connection 28 features three pairs of upstanding lugs on the cross-member 30, a central pair 28a of which receive the main tongue member 16 between them for pinned pivotal connection therewith, and outer pairs 28b of which likewise receive respective supports 34 of the tongue 12 that extend parallel to the second section 16b of the main longitudinal member 16 from a cross-member 36 thereof.

Forward from the tongue cross-member 36, side rails 38 of the tongue structure run parallel to the main longitudinal member 16 along each side thereof a short distance outward therefrom, and then angle inward to connect back to the main longitudinal member 16 proximate the bend therein. Reinforcements 40 span between each side rail 38 and the main longitudinal member 16 at spaced locations therealong. A single brace 42 on each side of the longitudinal member 16 obliquely angles outward from the respective side rail 38 to the outer end of the tongue's cross-member 36, where the respective support 34 then extends from the opposite side of the cross-member 36 for pivotal connection to the frame.

On another cross-member of the frame 14 at the front portion 18 thereof near the frame's leading end, an upright structure 44 features a pair of parallel uprights 46 disposed on each side of the tongue's main longitudinal member 16, the uprights lying perpendicular to the frame. A respective one of the tongue side rails 38 extends between each pair of uprights 46, and the tongue's main longitudinal member 16 extends between the two pairs. A cross-member 48 extends across the four uprights 46 to define the top of the upright structure. A short distance behind the upright structure 44, and undercarriage 50 of the pull tongue 12 features a cross-member 52 fixed to the side rails 38 a short distance therebelow by legs 54 depending perpendicularly downward therefrom, and by diagonal braces 56 that also span between the cross-member 52 and side rails 38 at positions behind the legs 54.

On each side of the tongue 12, a respective two-way hydraulic actuator 58 has its cylinder 58a pivotally attached to the respective end of the upright structure's cross-member 48 and its piston rod 58b pivotally attached to the respective end of the tongue's undercarriage cross-member 52. Accordingly, extending the hydraulic actuators 58 operates to push down on the undercarriage cross-member 52 relative to the cross-member 48 of the upright structure 44, thus acting to move the tongue 12 and frame 14 of the apparatus relatively toward one another. With the tongue 12 secured to the hitch of a tow vehicle, this thus acts to raise the front portion 18 of the frame 14, and the blade sections 22 attached thereto, upwardly toward the main longitudinal member 16 of the tongue about the pivot axis defined by the pivotal connection 28 between the frame and tongue. On the other hand, collapsing or retracting the actuators 58 causes relative movement between the frame and tongue in the opposite direction, i.e. moving the front frame section and the tongue longitudinal member 16 relatively away from one another so that the lower the leading end of the frame and the attached front blade sections 22 move away from the tongue's main longitudinal member 16 about the frame/tongue pivot axis near the rear of the machine. FIGS. 1 to 6 show the actuators 58 extended to position the blades close to the tongue, while FIG. 7 shows the actuators 58 retracted to space the blades further downward from the tongue for engagement of the blade apex 26 into the ground.

In addition to this angular positioning of the frame and attached blade about the frame/tongue pivot axis at the rear portion 20 of the frame, the frame and blade position is further controlled by raising and lowering of the rear frame portion 20 relative to the ground beneath it.

A wheel carrier unit 60 is pivotally attached to the same rear frame cross-member 30 as the tongue 12 by two pairs of rearwardly projecting wheel-pivoting lugs 62 each disposed adjacent a respective one of the upwardly projecting tongue-pivoting lug pairs 28b. A respective wheel carrier 64 has one end received between each wheel-pivoting lug pair 62 and pivotally pinned thereto. At the other end of the carrier member 64, at which the two carrier members 64 are interconnected by a cross-member 66, a respective wheel 68 is rotatably carried on the outer side of the carrier member 64. The two wheels 68 reside between opposing parallel side rails 70 of the rear frame section 20, which are rigidly joined together in front of the wheels 68 by the cross-member 30 of the frame/tongue pivotal connection 28, and behind the wheels 68 by the end cross-member 32 at the rear/trailing end of the frame 14.

A second upright structure 72 features two uprights 74 each fixed atop the cross-member 30 between a respective one of the wheel-pivoting lug pairs 62 at which the wheel carrier unit 60 is pivotally connected to the cross-member 30 for pivoting about a horizontal wheel-pivot axis just behind the cross-member. A cross member 76 extends between the uprights 74 of this second or rear upright structure 72 at their top ends. For each wheel 68, a respective hydraulic actuator 78 has its cylinder pivotally connected to one of uprights 74, and its piston rod pivotally connected to the corresponding one of the wheel carriers 64. Accordingly, extending of these actuators 78 pushes downward on the wheel carrier unit 60 about its horizontal pivot axis behind the cross-member 30, which acts to raise the cross-member 30 (and the rest of the rear frame portion attached thereto) about the common rotational axis shared by the two wheels 68. On the other hand, collapsing or retracting the actuators 78 has the opposite effect, lowering the rear frame tongue-connection cross-member 30 about the rotational axis of the wheels 68.

Each front blade section 22 extends fully from the apex 26 at the leading end of the frame 14 along a respective one of equal length sides of the front frame section 18 to where the rectangular rear frame section 20 is rigidly fixed to the front section by a cross-member 80 shared between the sections at the base of the front section's triangular shape and the front end of the rear section's rectangular shape. The width of the rear section is slightly less than the front section, in that the side rails 70 of the rear section 20 project from the shared cross-member 80 at positions slightly inward from the ends thereof.

On each its sides, the rear frame section 20 pivotally carries a respective sub-frame 82 on which a respective rear blade section 84 is rigidly mounted. Each sub-frame 82 has a triangular perimeter defined by an inner side rail 86 lying parallel to the respective side rail 70 of the rear frame section 20, a rear end cross-member 88 projecting perpendicularly from the rear end of the side rail 86, and a diagonal outer rail 90 obliquely connecting the free ends of the inner side rail and cross-member. In each sub-frame, an additional longitudinal member parallel to the inner side rail cooperates with additional cross-members and diagonal braces to give strength and rigidity to the sub-frame. Each rear blade section is fixed to the diagonal outer rail 90 of the respective sub-frame 82 to extend parallel thereto, and further supported in its fixed position and orientation by braces 92 inclining obliquely upward to an inner skin of the blade from the plane of the sub-frame.

In a position intended for use, each rear blade section 84 spans the full length of the diagonal outer rail 90 of the respective sub-frame 82 from a position adjacent the rear end of the respective front blade section 22 to a short distance past the end cross-member 88 of the respective sub-frame 82. The angle of each sub-frame's diagonal outer rail 90 moving rearward along the longitudinal axis of the apparatus is not as steep as the respective diagonal side rail of the triangular front section 18 of the frame 14, and so the symmetrical rear blades 84 diverge at a greater angle toward the rear of the apparatus than the front blades 22.

To reduce the overall width of the apparatus, for example for transport or for creation of narrower ditches, the rear blades 84 can be retracted from deployed positions (shown in FIGS. 1 through 6) to stowed positions (shown in FIG. 7) raised from out of their useful working positions trailing the front blade sections 22 at the rear ends thereof. For this purpose, a rear-blade hydraulic actuator 94 for each sub-frame 82 has its piston rod pivotally connected to an internal longitudinal member 96 of the sub-frame 82 for pivoting about an axis parallel thereto, and its cylinder pivotally connected to a bracket 97 projecting vertically upward from the center of the cross-member 76 of the rear upright structure 72 for pivoting about an axis parallel to the longitudinal axis of the frame 14. Each sub frame 82 is pivotally carried on the respective side rail 70 of the rear frame section 20 by pairs of lug brackets 98 fixed on the frame side rail 70 to project laterally outward therefrom for pivotal pinning of the sub-frame 82 to the lug brackets 98 at an inner end of the sub-frame end cross-member 88 and stub members 100 projecting toward the frame from the sub-frame's inner side rail 86. Accordingly, retraction or collapse of each actuator 94 pulls the respective sub-frame 82, and the rear blade section 84 attached thereto, upward about the axis of the pivotal connection of the sub-frame 82 to the side rail 70 of the rear frame section. In the retracted position, the sub-frame projects upward from the side rail 70 to situated the blade 84 in a position lying at least partially over the side rail, or further inward over the rear frame, so that components of the rear blade and sub-frame are located entirely inward from the rear ends of the front blade sections, which now define the overall width of the apparatus.

To better support each sub frame's lateral extension outward from the rear section 20 of the rigid main frame 14, the rear end cross-member 88 of each sub-frame 82 features a pair of rearwardly extending lug plates 102, like those used to carry the wheels 98 of the rear frame section 20, to pivotally mount a respective wheel carrier 104 rotatably carrying a respective outboard wheel 106. An outboard hydraulic actuator 108 has its cylinder end pivotally connected to an upright 110 that is fixed to the sub-frame's rear end cross-member 88 adjacent one of the lug plates 102 thereon and is braced on an internal cross-member 112 by diagonal brace 114, and its piston rod pivotally connected to the outboard wheel carrier 104. When the sub-frames and rear blades 84 are deployed for use, the outboard actuator 108 is extended to pivot the wheel carrier downward about its pivotal connection to the sub-frame's rear end cross-member 88 until the wheel engages the ground to rollingly support the sub-frame thereon. When the sub-frames and rear blades 84 are raised into the stowed positions, the outboard actuator 108 is retracted to pivot the wheel carrier about its pivotal connection to the sub-frame's rear end cross-member 88 in the opposite direction to extend the outboard wheel carrier 104 to the same side of the sub-frame 82 as the upright 110 to avoid or minimize projection of the outboard wheel 106 laterally outward from the stowed sub-frame and rear blade. The range of motion of the outboard actuator and wheel is sufficient to allow repositioning of the wheel's rotational axis from one side of the plane of the sub-frame to the other.

From the above description, it will be appreciated that the angle between the frame, on which the front blade sections are fixed, and the tongue can be adjusted to set the distance by which the apex 26 of the blade is spaced below the tongue by use of the actuators 58 near the front of the apparatus, and the height of the rear end of the frame relative to the ground can be adjusted by use of the actuators 78 near the rear of the apparatus. For transport of the apparatus, the rear actuators 78 are extended to raise the rear end of the frame and the front actuators 58 are retracted to lift the front end of the frame and front blade sections up toward the trailer tongue so that the entire blade, including the apex 26, is spaced above the ground. For use of the apparatus in a ditching operation, combined operations of the various actuators can be used to achieve various combinations of ditch depth, and width, as described herein further below.

Similar to the mounting of the rear blade sections in fixed positions on the sub-frames pivotally carried on the rear frames, the front blade sections 22 are each rigidly fixed to a respective outer diagonal rail 116 of the triangular front frame section 18. The two diagonal rails 116 meet at an oblique angle to define the pointed leading end of the frame. Like the rear-blade sub-frames, the front frame section employs numerous longitudinal members, cross-members and diagonal braces to provide strength and rigidity between its side rails, and employs obliquely inclined braces 118 between the shared cross-member 80 and the inner skin of each front blade section to further reinforce the blade section's fixed, stationary position on the diagonal side rail 116. Further forward from the shared cross-member 80, horizontal cross-members 120, 122 extending fully between the two blade sections 22, and stub-members 124 extending between each blade section 22 and the nearest upright of the front end upright structure 44, are employed at heights above the side rails 116 instead to also reinforce the fixed position blade sections. The grid-like longitudinal and transverse configuration of frame members in the front frame, rear frame and sub-frame sections, along with further diagonal bracing in the front frame and sub-frame sections, cooperate with the fixed-position rigid mounting of the blade sections to provide a robust design suitable capable of handing load forces associated with displacement of large volumes of earth for large-scale ditch formation, and rely on the angular and height adjustability of the frame, and selectively deployable configuration of the rear blades, to set the desired ditch depth and width rather than employing blades of adjustable divergence angle to set the desired width.

Figure 6:
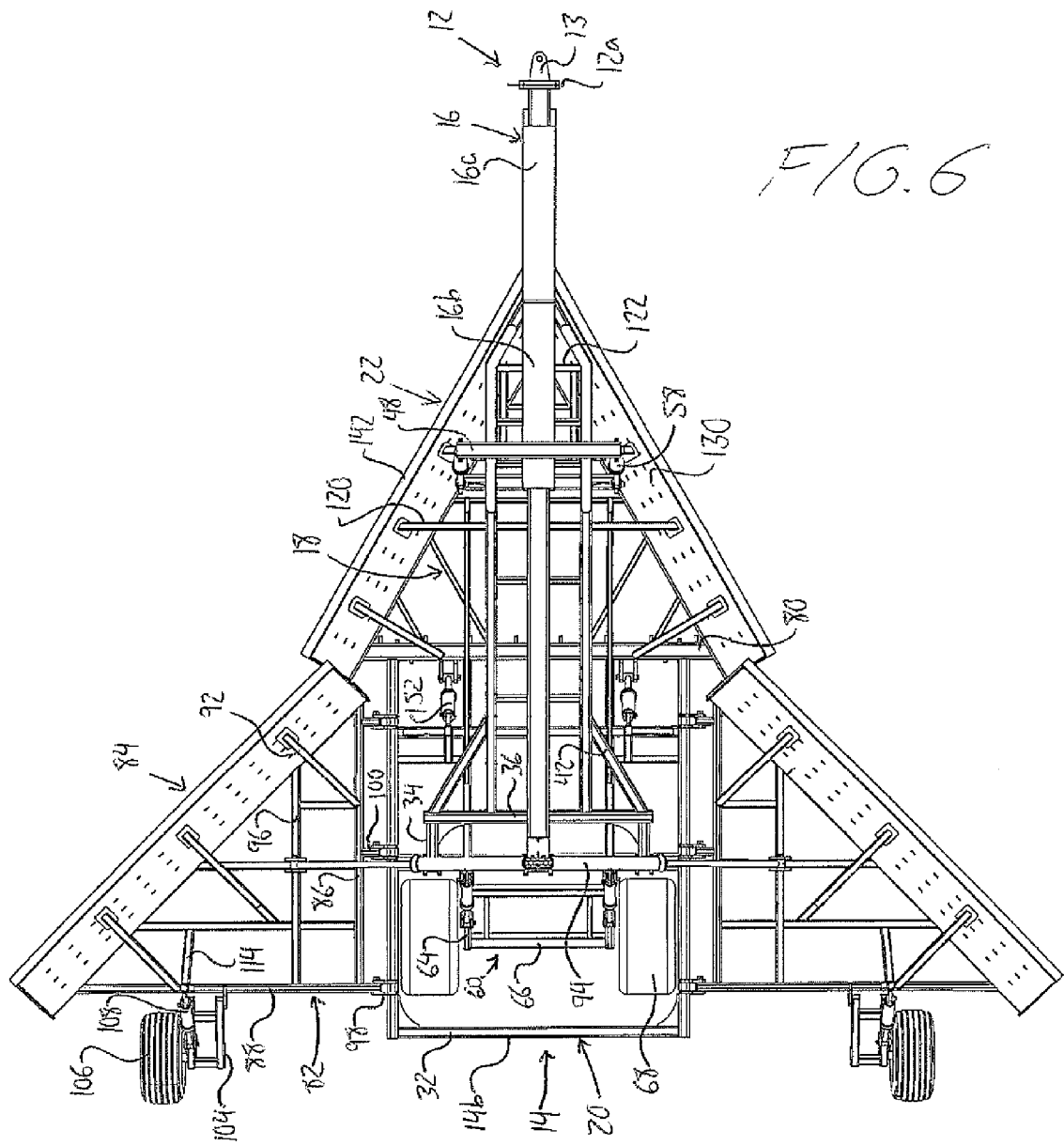
FIG. 6 is an overhead plan view of the ditching apparatus of FIG. 1.

As best shown in the plan view of FIG. 6, the wheels 68 of the rear frame portion 20 line up in the transverse direction of the machine with points on the working edges of the front blade sections 22 proximate the cross-member 120 situated between the front upright structure 44 and the shared cross-member 80 that marks the division of the front and rear frame sections 18, 20. The wheels 68 will accordingly ride on the sloped sides of the formed ditch after the combination of frame height and angle have been set for a ditch depth and width that positions these working edge points below ground level.

Having now described the structure and functionality of the frame, tongue, sub-frames and associated actuators, attention is now turned to structural and mounting details of the blade sections.

Each blade section features an inner skin layer that faces rearwardly and inwardly toward the frame 14, and an outer skin layer that faces forwardly and laterally outward from the frame 14 to form a working surface that handles the earth or soil displaced during use of the apparatus. The inner skin features a flat plate 130 having its bottom end fixed to the respective diagonal side rail 116, 90 of the frame 14 or sub-frame 82 in alignment with the length of the diagonal side rail at an inner side thereof facing inward toward the rest of the frame. The plate 130 slopes obliquely upward from the side rail in a direction moving laterally outward therefrom. The outer skin features a metal sheet 132 having an inner face fixed to the outer side of the diagonal rail and having been roll-formed to so that its outer face forms a smooth, continuous, concave curve between the upper and lower edges of the sheet, each of which lies outward from the outer side of the rail. The outer sheet's curve, position and orientation are such that its upper and lower edges reside at elevations respectively above and below the diagonal side rail, it slopes outwardly away from the frame as it approaches each such edge, and the upper edge 132a resides further laterally outward from the frame than the lower edge.

This shape of the blade profile is such that when the soil reaches a particular point on the blade, it is forced to the ceiling or top of the blade where it is eventually dispensed from the blades upper edge, where it falls from the blade to complete a rolling action of the soil originally displaced from the ground by the bottom working edge. In a cross-section of the blade perpendicular to its length, a bottom portion of the outer skins curved profile is approximately ⅓ of a circle's circumference, i.e. an arcuate curve spanning about 120-degrees, and from the top end of this arcuate portion, the profile then straightens out to extend linearly to the top edge of the blade skin.

With reference to FIG. 11, the outer skins 132 for the rear blade sections 84 have top and bottom edges 132a, 132b of nearly equal length, the top edge 132a being slightly shorter than the bottom edge 132b. These rear blade outer skins, if laid out flat, would only deviate from a rectangular shape at the corner between the top edge of the skin and the leading end thereof, where this leading or front end of the skin angles upwardly toward the opposing end of the skin. The resulting sloped end 84a of the rear blade section 84 over the linear top portion of its outer skin's curve provides clearance for movement of rear blade section with the respective subframe 82 during raising or lowering of the rear blade section, without interference by or contact with the respective front blade section.

Figure 12A:
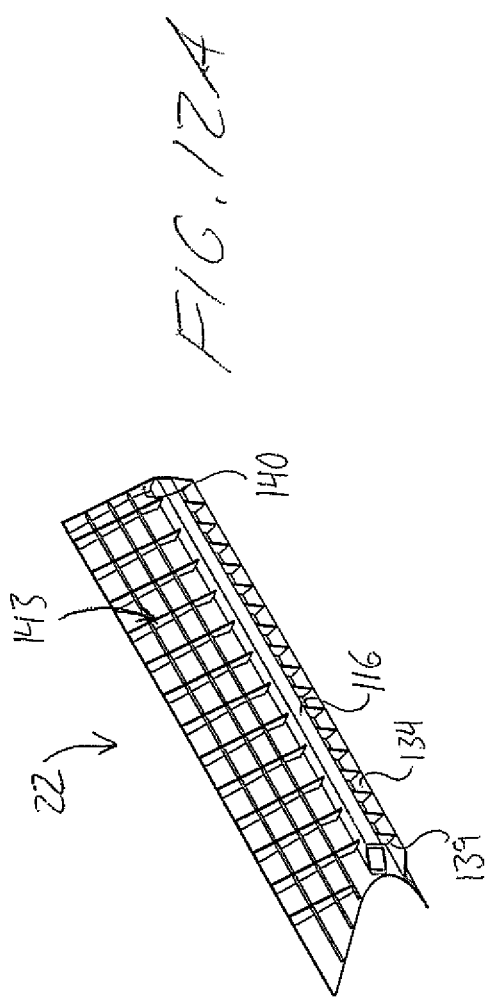
FIGS. 12A, 12B and 12C are rear end perspective, rear elevational and front elevational views of the front blade sections of the apparatus of FIG. 1 with inner skins and working plates thereof removed for illustrative purposes.
Figure 12C:
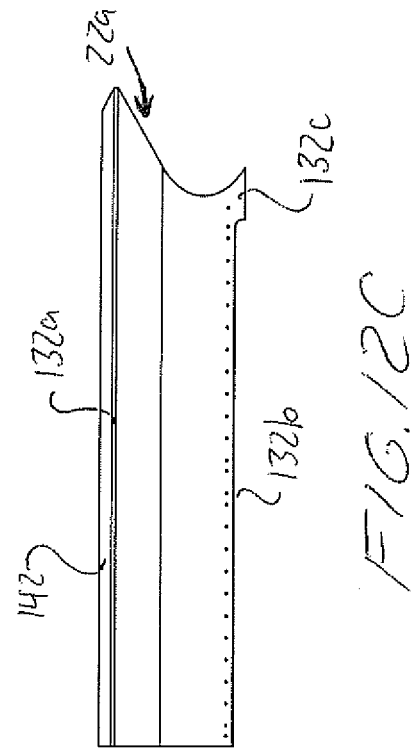
Figure 12B:
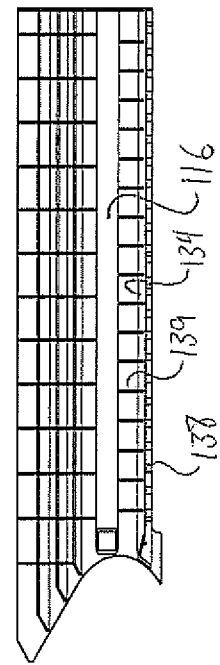

With reference to FIG. 12, the outer skin sheets 132 of the front blade sections 22 have longer top edges 132a than bottom edges 132b so that the cross-sections of the outer skins of the two front blade sections meet up with one another over the full height profile of these blade sections at the apex 26 of the blade. While the plates 130 of the inner skins of the rear blade sections 84 are rectangular, the plates of the front blade inner skins deviate from rectangular at sloped front ends so that the two front blade sections butt up against one another over their equal heights where they are joined to form the blade apex at the leading end of the frame.

A right angle channel 134 is fixed to the inner face of the outer sheet 132 to place the free end of one leg of the channel's L-shaped cross-section flush with the bottom edge of the outer sheet 132, and position the other leg at a position jutting inwardly from the inner face of the outer sheet at a height shortly above the outer sheet's bottom edge. Small reinforcement plates span between the two legs of the channel at spaced apart positions therealong, and for example may include either or both of plates fitting into the corner between the legs (like illustrated triangular plates 136 at the ends of each channel) and plates connecting to the two legs only outward from that corner (like illustrated rectangular plates 138 spaced along the channels between the end triangular plates 136). Above the channel 134, spacer plates 139 are fixed atop the leg of the channel that juts from the outer sheet 134, so as to span between the channel and the diagonal side rail 90, 116 thereabove at spaced positions therealong.

The inner space between the two skins of section is closed off at each end of the rear blade sections and at the rear end of the front blade sections thereof by a respective end plate 140 that spans between the two skins from the top edges thereof down to the diagonal side rail 90, 116, where the end plate 140 is fixed to the end of the side rail and continues down for further attachment to the inward jutting leg of the channel 134. A top panel or plate 142 closes off the top boundary between the inner and outer skins from one end plate to the other. As shown in FIGS. 11 and 12, each blade section further features a grid 143 of perpendicularly transverse reinforcement plates spanning between and fixed to the plates of the inner and outer skins from the top of the diagonal frame member 90, 116 to the top panel or plate 142 of the blade section. The top panel or plate 142 thus forms the uppermost one of this grid's longitudinal reinforcement members running along the blade section, while the end plates at the rear ends of the blade sections each define an endmost on of the grid's upright reinforcement members running upwardly and outwardly transverse to the blade section's length.

A working bottom edge of each blade section is not defined by the outer skin plate 132 itself, but rather by an additional rectangular plate 143 fixed to the outer face of the outer skin plate 132 a short distance thereabove to depend a short distance downwardly and outwardly past the outer skin plate's bottom edge. The plate may employ a similar structure and material make-up as a conventional grader blade so as to provide a hardened wear surface for increased durability, and be replaceable as the part wears over time. On the rear blade sections 84, this outermost working plate 143, or series of such plates positioned end-to-end along the blade, extends the full length of the blade. However, on the front blade sections 22, the working plate arrangement 143 extends to the rear end of the blade section, but stops short of a seam 144 at which the outer skins of the two front blade sections are abutted and joined together to form the apex 26 of the overall blade structure. The lower portion of this apex 26 is where the overall blade first engages the intact ground, and it is equipped with a nose cap or tip 146 described below.

The nose cap 146 has a wing, sweep or V-like shape much like the overall front blade structure of the apparatus, thus diverging rearward from its forward end. However, unlike the sharp corner or edge formed by the tightly joined ends of the outer skins of the front blade sections, nose cap 146 features a wider breaking surface that spans a notable lateral distance across this meeting of the blade skins to impact against the earth at this first point of contact with the ground to better break up the soil for division thereof to both sides of the blade apex for subsequent lateral distribution along the diverging blade sections to travel upwardly and laterally out from the resulting ditch. The illustrated nose cap is thus formed by a single unitary plate that has been bent to integrally form two planar wing portions 146a diverging rearwardly from a curved bend 146b that embraces about the seam between the outer skins of the front blade sections. This curve wrapping about the apex seam presents a greater forward facing, laterally spanning surface area than the sharp edge of the seam, thus better breaking up the soil at the initial point of engagement compared to the cutting-action of a sharper edge or point.

The plate material from which the nose cap 146 is formed is of greater thickness than the planar rectangular working plate(s) 143 forming the bottom working edge of the front blade from the rear end of the nose back to the rear end of the blade. This provides greater strength and durability at the blade's first point of engagement with the ground and provides a larger surface area at the forward facing convexly curved tip of the nose, compared to use of a thinner plate, due to the larger radius of curvature at the bend of the plate because of the greater plate thickness. The wings 146a of the nose cap 146 have their top and bottom edges in linear alignment with the linear top and bottom edges of the working plates 143 along the blade. Accordingly, the bottom edges of the wings 146a of the nose cap 146 are coplanar with the bottom edges of the working plates 143 so that no part of the nose cap extends below the plane of the lower working edges of the front blades, as defined by the working plates thereon.

When the rear blade sections are deployed, their working edges defined by the bottom edges of their working plates are also substantially coplanar with the bottom edges of the working plates and nose cap wings of the front blade sections.

The nose cap may produced from multiple pieces as opposed to the aforementioned unitary-plate construction, for example being formed from two initially separate plate like pieces each to be mounted against a respective one of the front blade sections so that the two pieces meet together in front of the seam between these blade sections, where the two pieces are joined together in front of the seam to define a curved or flat surface spanning thereacross. Whether completely flat or somewhat curved, this leading surface of the nose spanning across the seam preferably has a notable width somewhere between 1.5 and 4.5 inches, and more preferably approximately 3-inches across the blade seam. The nose cap is preferably hard surfaced or otherwise treated for improved wear resistance, for example in same manner as the working plates 143.

The wide leading surface of the nose tends to reduce catching or damaging of the tip under impact with rocks or other obstructions met in the ground during use of the machine. As shown in FIG. 12, the outer skin 132 of each front blade section may depend further downward at the leading end 22a thereof so that the bottom edge of the skin will lie in or near alignment with the bottom edge of the working plate 43 mounted to the outer skin just behind this lower-depending leading portion 132c of the front blade outer skin. The bottom of the nose cap lies substantially coplanar with these lower edges of the skin's leading portion and the working plate trailing therebehind. The downward extension 132c of the front blade outer skin is a smooth continuous extension of the outer skin's curve or profile from the seam at the blade apex back to where the bottom edge of the outer skin juts up at the transition to the shorter-height, trailing remainder of the skin. Behind the blade apex, the frame is preferably strengthened by use of thicker, heavier steel or other material than other frame portions, gusseting, bracketing, bracing and/or multiple layers of frame work spread over a partial or full height of the blade.

The illustrated machine includes a ground scarifier 150 carried on the frame near the rear end of the front blade sections by additional actuators 152. The scarifier features a cross-member 154 extending in the transverse direction of the frame therebelow and carrying a plurality of teeth or ground engagement tools 156 at spaced locations along its length (i.e. across the width of the frame). In FIGS. 1 to 6 the scarifier is shown in a lowered position deployed far enough below the frame to reach past the wheels to engage the teeth into the ground. This device can be deployed for the purpose of loosening, and break up the soil in first pass before running with blade deployed into the ground to form a ditch. A similar device may be employed elsewhere on the frame for similar operations.

Having described the structural aspects of the machine, attention is now turned to its various uses or operation modes.

FIG. 7 shows the machine in a full transport mode, in which not only is the front end of the frame raised to its maximum elevation relative to the frame like in the FIGS. 1 to 6, but the rear blade sections 84 are raised into their stowed positions by upward pivoting of the subframes 85, and the scarifier 150 is tucked up beneath the frame in close proximity thereto by swinging its cross-member 154 upward and rearward about its pivotal suspension from the frame through use of the respective frame-mounted actuators 152.

Figure 8A:
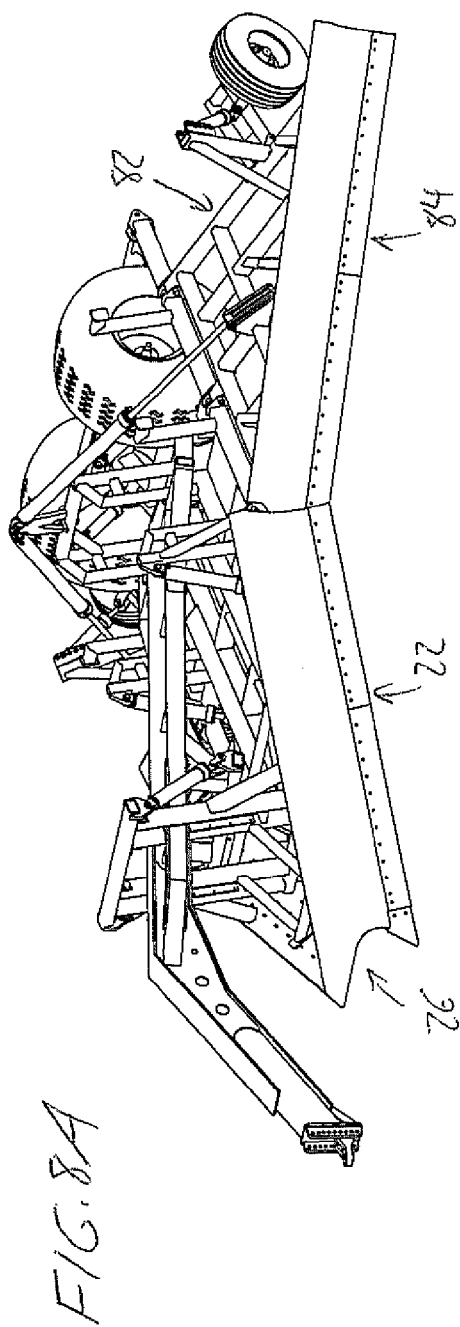
FIGS. 8A and 8B are front side perspective and side elevational views of the apparatus of FIG. 1 in a narrow ditching mode with the frame's front end lowered to dig front blade sections into the ground, and the rear blade sections lowered relative to the rear of the frame to run level over the ground.
Figure 8B:
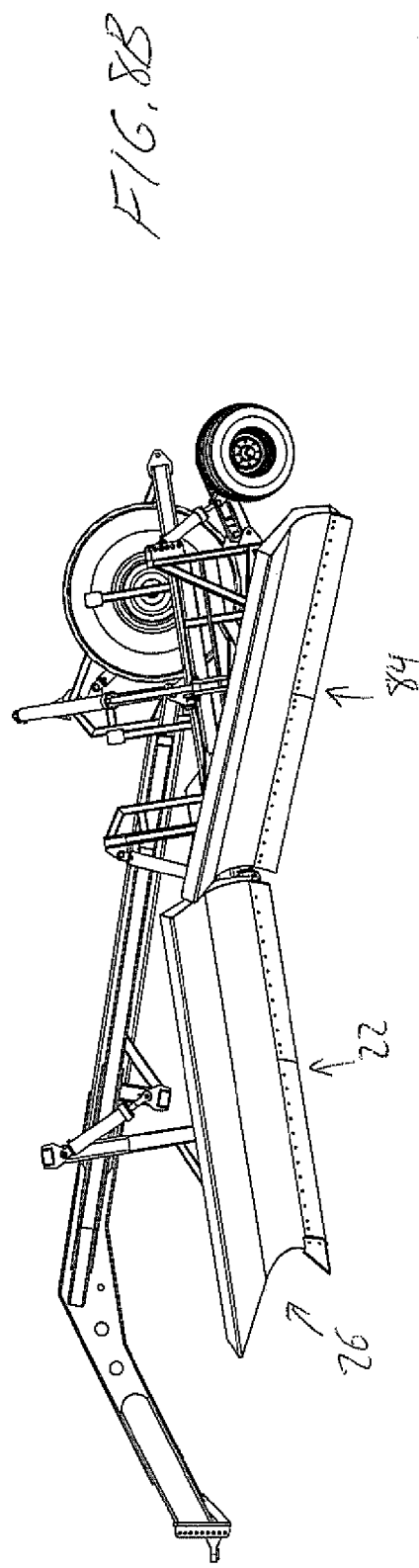

FIG. 8 shows the machine in a suitable condition for forming a relatively narrow ditch. The front end of the frame is lowered to engage the apex 26 at the tip of the front blade sections 22 into the ground. The rear blade sections 84 are lowered from their stowed positions, downward therefrom past the deployed positions of FIGS. 1 to 6 wherein the subframes 82 are parallel to the main frame. As the main frame is tilted out of horizontal in order to point the blade apex 26 downward, having the rear blades 84 level with the main frame would orient the rear blades 84 in a manner sloping upward from front to rear. Instead, the subframes 82 are lowered past the plane of the frame to set the rear blades 84 in positions angling horizontally outward from the frame. Under towing of the machine, the frame tilting and main wheel adjusting actuators are controlled to set the tip of the front blade sections into the ground to a depth where the rear ends of the front blade sections 22, and thus the rear blade sections 84 angling horizontally outward therefrom, are at ground level. Earth is broken up and divided at the nose or tip of the blade, rides rearward along the front blade sections up the sloped sides of the resulting ditch, and then is spread laterally outward from the ditch at ground level by the horizontally-deployed rear blade sections.

FIG. 9 shows the machine in a suitable condition for forming a wider ditch. The front end of the frame is again lowered to engage the apex 26 at the tip of the front blade sections 22 into the ground, but the rear blade sections 84 are lowered from their stowed positions only to the level positioning them coplanar with the frame and in alignment with the front blade sections 22. Under towing of the machine, the frame tilting and main wheel adjusting actuators are controlled to again set the tip of the front blade sections into the ground, but to a greater depth where at least part of the rear blade sections 84 will also reach a point below ground level and thus contribute to the formation of the sides of the ditch. As the rear blades diverge outward from the front blades, this thus forms a wider ditch than in the scenario of FIG. 8. The depth is set so that the rear ends of the rear blades 84 are at or above ground level when the blade apex 26 has reached the desired bottom depth of the ditch so that the displaced earth follows the blade sections rearward thereupon and up the sides of the ditch to the ground surface thereabove.

FIG. 10 shows adjustment of the front and rear blade sections into yet another configuration for another mode of operation. Here, the machine is set for plowing along the side of an existing ditch, for example for snow removal purposes. Here is the front end of the frame is raised to keep the front blade sections spaced above the ground. One of the rear blade sections is lowered past the plane of the main frame so as to slope downwardly moving rearwardly along. The downward angle of the rear blade is set with the machine positioned beside an existing ditch so that the rear end of the blade depends part way down into the ditch. Accordingly, snow accumulation above the ditch at the side thereof will be directed down into the ditch as the machine is towed alongside the ditch. In the drawing, both rear blade sections are lowered in this manner for running a plowering operation between two ditches. However, it will be understood that each rear wing is independently controllable by its is respective operator to allow use of only one rear blade section for applications requiring such a configuration.

Intended to enable single-pass creation of large scale ditches, yet allowing use for smaller scale projects by using the frame depth and angle to control how much of the overall blade structure's length is lowered into the ground, the illustrated embodiment is based on an overall blade width of 32-feet at the rear end of the deployed rear blades, and a robust steel-tubing rigid-frame and steel fixed-position blade sections having the necessary strength to handle loads experienced in formation of such wide ditches. Rigidly mounting the blade sections in fixed-angle positions cooperates with the robust frame to be able to handle high loading compared to angularly adjustable blade configurations. Employing front frame tilting actuators acting on a rear end pivotal connection of the frame to the trailer provides a long leverage arm in the overpassing tongue for handling the significant weight of the robust steel frame during its angular adjustment and handling side loading on the blades during use. Of course a similar overhead tongue arrangement for pivoting the frame near its rear end may also be employed in smaller scale, less heavy duty designs. Similar machines of different widths, materials and frame designs may still gain advantage from one or more unique features of the disclosed apparatus, including the rear pivot overhead pull tongue arrangement with the frame, the nose design acting to break and divide ground as opposed to a sharper cutting action, the use of roll-formed blade skins to provide smooth continuous curves for rolling the soil as opposed to brake-bent metal using distinct planar sections between several bends to approximate an overall curved profile, selectively deployable rear blade sections that fold up for compact transport of the machine, and double skinned blade designs to improve strength and durability.

The illustrated embodiment was designed for towing by a large scale agricultural tractor having an onboard hydraulic system from which the actuators may be powered and controlled in a conventional manner. Alternate embodiments may alternatively employ an onboard power source for the various actuators. Tow vehicles other than farm tractors may be employed for pulling of the apparatus, including the possibility of a dedicated tow vehicle intended specifically for use with the ditching apparatus, in which case a permanent or semi-permanent connection between the vehicle and the pull tongue would effectively make the apparatus self conveying.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A ditching apparatus for pulling by a tow vehicle, the ditching apparatus comprising:
   a frame having a leading end and an opposing trailing end spaced apart along a working direction in the apparatus is to be drawn by the tow vehicle;
   wheels rotatably carried on the frame adjacent the trailing end thereof for rolling support thereof;
   two front blade sections respectively disposed on opposing sides of a longitudinal axis passing through the opposed leading and trailing ends of the frame, the two blade sections being fixed to the frame and diverging away from one another from a blade apex ahead of the leading end of the frame toward the opposing trailing end of the frame, and each blade section presenting an working surface that faces forwardly and laterally outward from the frame and curves concavely between upper and lower edges of the working surface;
   a pull tongue having a front end adapted for coupling with the tow vehicle at a location forward of the blade apex and leading end of the frame, the pull tongue extending over the blade apex and the leading end of the frame to a rear end of the pull tongue, where a pivotal connection couples the pull tongue to the frame at a location nearer to the trailing end of the frame than to the leading thereof, the pivotal connection allowing relative pivoting between the pull tongue and the frame about a transverse pivot axis oriented cross-wise to the longitudinal axis;
   an undercarriage mounted to the pull tongue;
   an upright structure upstanding from the frame on opposite sides of the pull tongue at a position between the pivotal connection and the leading end of the frame; and
   a first pair of hydraulic actuators disposed on said opposite sides of the pull tongue at a location nearer to the leading end of the frame than to the trailing end thereof, each actuator having a lower end thereof coupled to the undercarriage at a distance below the pull tongue and an upper end coupled to the upright structure, the hydraulic actuators being extendable and retractable to effect relative pivoting between the frame and the pull tongue in opposite directions about the transverse pivot axis to move the blade apex at the leading end of the frame respectively upward and downward relative to the pull tongue;
   whereby operation of the first pair of hydraulic actuators enables adjustment of an angle between the blade sections on the frame and the trailer tongue to control a depth to which the blade apex penetrates the ground over which the apparatus is pulled by the tow vehicle.

2. The ditching apparatus of claim 1 comprising a second pair of hydraulic actuators that are coupled between the frame and wheel carriers on which the wheels are carried and are operable to raise and lower the trailing end of the frame relative to the ground by moving the wheels and upward and downward relative to the frame.

3. The ditching apparatus of claim 1 further comprising two rear blade sections respectively disposed on opposing sides of the frame to extend respectively rearwardly and laterally outward from ends of the front blade sections opposite the blade apex, the rear blade sections diverging toward the trailing end of the frame at a greater angle relative to one another than the front blade sections.

4. The ditching apparatus of claim 1 further comprising two rear blade sections movably mounted on opposing sides of the frame independently of the front blade sections and raisable and lowerable about respective pivot axes that lie longitudinally of the frame between deployed positions extending respectively rearwardly and laterally outward from ends of the front blade sections opposite the blade apex, and stowed positions elevated out of the deployed positions at the ends of the front blade sections.

5. The ditching apparatus of claim 4 comprising rear blade support sub frames that are pivotally mounted on respective sides of the frame, independently of the front blade sections, and on which the rear blade sections are rigidly mounted at fixed positions on the sub frames.

6. A ditching apparatus comprising:
   a frame having a leading end and an opposing trailing end spaced apart along a working direction in the apparatus is to be conveyed over the ground;
   wheels rotatably carried on the frame adjacent the trailing end thereof for rolling support thereof;
   two front blade sections carried on the frame on opposing sides of a longitudinal axis passing through the opposed leading and trailing ends of the frame, the two blade sections diverging away from one another from a blade apex ahead of the leading end of the frame toward the opposing trailing end of the frame, and each blade section presenting an working surface that faces forwardly and laterally outward from the frame and curves concavely between upper and lower edges of the working surface;

rear blade support sub frames movably mounted on respective sides of the frame independently of the front blade sections;

two rear blade sections mounted on the sub frames, the sub frames being positionable to situate the rear blade sections in positions extending respectively rearwardly and laterally outward from ends of the front blade sections opposite the blade apex; and outboard wheels rotably carried on the sub frames.

7. The ditching apparatus of claim 6 wherein the outboard wheels are movably mounted to the sub frames and are each adjustable in position by an actuation mechanism to change a position of a rotational axis of the outboard wheel relative to a plane of the sub frame on which said outboard wheel is carried.

8. The ditching apparatus of claim 7 wherein a range of motion through which each outboard wheel is movable is sufficient to reposition the rotational axis of the outboard wheel from one side of the plane of the sub frame to another.

9. The ditching apparatus of claim 7 wherein the rear blade sections are rigidly mounted at fixed positions on the sub frames.

* * * * *